(12) United States Patent
Matsumoto (10) Patent No.: US 8,429,976 B2
(45) Date of Patent: Apr. 30, 2013

(54) LOW COST RESONATOR-BASED PRESSURE TRANSDUCER

(75) Inventor: Noriyuki Matsumoto, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 225 days.

(21) Appl. No.: 12/783,511

(22) Filed: May 19, 2010

(65) Prior Publication Data

US 2011/0283801 A1 Nov. 24, 2011

(51) Int. Cl.
*G01L 11/00* (2006.01)

(52) U.S. Cl.
USPC .......................................................... 73/702

(58) Field of Classification Search ............. 73/700–756
See application file for complete search history.

(56) References Cited

U.S. PATENT DOCUMENTS

| | | | |
|---|---|---|---|
| 3,617,780 A | 11/1971 | Benjaminson et al. | |
| 4,419,600 A | 12/1983 | Sinha | |
| 4,455,874 A * | 6/1984 | Paros | 73/704 |
| 4,547,691 A | 10/1985 | Valdois et al. | |
| 4,550,610 A * | 11/1985 | EerNisse | 73/702 |
| 4,554,717 A | 11/1985 | Vig et al. | |
| 4,562,375 A * | 12/1985 | Besson et al. | 310/338 |
| 4,660,420 A * | 4/1987 | Eer Nisse | 73/702 |
| 4,754,646 A * | 7/1988 | EerNisse et al. | 73/702 |
| 4,984,467 A | 1/1991 | Haefner | |
| 5,394,345 A | 2/1995 | Berard et al. | |
| 6,111,340 A * | 8/2000 | Sinha et al. | 310/361 |
| 6,145,383 A | 11/2000 | Meringdal et al. | |
| 6,461,301 B2 * | 10/2002 | Smith | 600/438 |
| 6,598,481 B1 * | 7/2003 | Schultz | 73/702 |
| 2001/0037066 A1 * | 11/2001 | Smith | 600/462 |
| 2004/0129086 A1 * | 7/2004 | Binet et al. | 73/754 |
| 2008/0289431 A1 * | 11/2008 | Lohr et al. | 73/703 |
| 2009/0009036 A1 | 1/2009 | Matsumoto et al. | |
| 2009/0151461 A1 * | 6/2009 | Ishii | 73/702 |
| 2009/0193903 A1 | 8/2009 | Cobianu et al. | |
| 2010/0102944 A1 * | 4/2010 | Lynn | 340/448 |
| 2010/0242615 A1 * | 9/2010 | Sato et al. | 73/702 |

FOREIGN PATENT DOCUMENTS

| | | |
|---|---|---|
| EP | 373010 | 6/1994 |
| GB | 2178536 | 2/1987 |

OTHER PUBLICATIONS

O. Vallin, et al., "Direct bonded quartz resonators", Frequency Control Symposium and PDA Exhibition, 2001, Proceedings of the IEEE International. pp. 345-348, 608 Jun. 2001.

* cited by examiner

*Primary Examiner* — Andre Allen
(74) *Attorney, Agent, or Firm* — Jianguang Du; Jody DeStefanis (57) ABSTRACT

An improved manufacturing process for resonator-based pressure transducers is described. The process is a batch process in which several resonators are shaped simultaneously, using an etching process such as plasma etching. The end pieces are also shaped, if required, for several transducers. The end pieces and resonators are sandwiched together prior to separating the individual transducer units. The individual transducer units are then separated using a cutting process. The described process can be used to manufacture pressure transducers having a substantially smaller size, for example 5-6 mm outer dimensions and 2-3 mm resonators. The outer shape of the transducers can be a non-circular cylindrical shape such as that of a right square prism or an octagonal prism.

32 Claims, 9 Drawing Sheets

LOW COST RESONATOR-BASED PRESSURE TRANSDUCER

BACKGROUND

1. Field of the Invention

This patent specification relates to pressure transducers. More particularly, this patent specification relates to resonator-based pressure transducers having non-circular cross sections and to improved methods for manufacturing the same.

2. Background

Piezoelectric pressure and temperature sensors typically have a crystal resonator located inside a housing with electrodes. Environmental pressure and temperature are transmitted to the resonator, via the housing, and changes in the resonator are sensed and used to interpret the pressure and/or temperature. U.S. Pat. No. 3,617,780, incorporated herein by reference, describes one example of a piezoelectric pressure transducer. In conventional devices, known as single-mode transducers that utilize single-mode oscillation, the resonator is affected by both temperature and pressure such that some devices may not be suitable for use in environments where both temperature and pressure vary.

One approach that is utilized to minimize fluctuations in pressure measurements is to use resonators with dual-mode oscillation. U.S. Pat. Nos. 4,419,600, 4,547,691 and 5,394,345, all incorporated by reference herein, disclose examples of such pressure transducers. However, transducer geometry for such resonators tends to be relatively complex, and the transducer tends to be larger due to the manufacturing process. Under certain conditions, such as in oil or gas wells, stress on the transducer may cause material twinning or micro-cracks that might damage the pressure transducer.

Figure 1A:
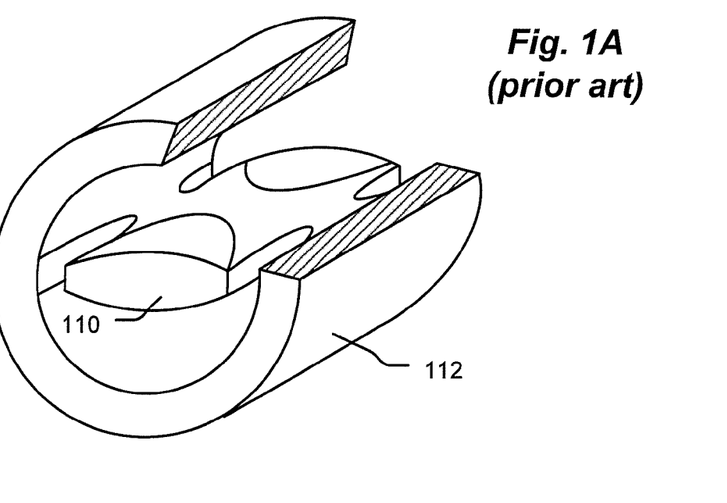
FIGS. 1A and 1B depict examples of known pressure transducers having circular cylindrical outer shapes.
Figure 1B:
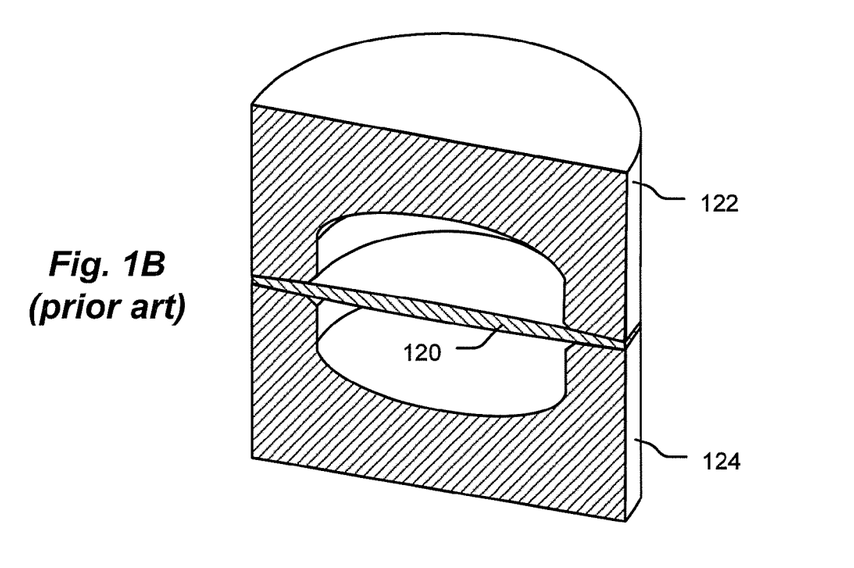

FIGS. 1A and 1B depict examples of known pressure transducers having circular cylindrical outer shapes. In particular, FIG. 1A depicts an example of a classic pressure transducer in which resonator 110 has two vibrational modes at different frequencies. Housing 112 has a circular cylindrical outer shape. FIG. 1B depicts an example of pressure transducer having an axisymmetric housing that includes two end caps 122 and 124. For further details of such transducers, see U.S. Patent Publication No. 2009/0009036, which is incorporated by reference herein.

Conventional manufacturing processes for pressure transducers such as shown in FIGS. 1A and 1B using mechanical lapping and/or grinding of individual components and assembly of a single transducer. For example, the transducer shown in FIG. 1B is made of two end caps 122 and 124, and a resonator 120. Each of these pieces are mechanically shaped using, for example, chemical mechanical polishing, lapping and/or grinding. After shaping, the pressure transducer is assembled using, for example, a bonding process.

Such conventional manufacturing processes are relatively expensive due to the mechanical shaping of the individual components and assembly of each pressure transducer unit. Additionally conventional designs are relatively large in size, which leads to more material being required which further increases the cost. For example, the classic design shown in FIG. 1A is typically about 22 mm in outer diameter. The design shown in FIG. 1B is substantially smaller, typically about 15 mm in outer diameter. However if further miniaturization can be accomplished, larger cost savings could be realized.

U.S. Pat. No. 4,554,717 discusses a method of making square-shaped quartz crystal resonators using chemical polishing and photolithographic techniques. There is no discussion of using the method for manufacturing pressure transducers.

Thus, there is a need for a more cost effective design for resonator-based pressure transducers having improved manufacturability.

SUMMARY

According to embodiments, pressure transducer is provided. The pressure transducer includes a housing having a non-circular cylindrical outer shape, and a resonator member located within the housing. Examples of the housing outer shape include a right prism, such as a right square prism or an octagonal prism.

The resonator member includes a piezoelectric resonator, which according to some embodiments can be shaped bi-convex or planar-convex. According to some embodiments the resonator is a double rotation cut piezo quartz material configured or designed for vibrating in at least two modes.

According to some embodiments the resonator is circular and is less than about 5 mm in diameter. The housing is rotationally symmetrical and is preferably not axisymmetrical.

According to some embodiments the housing includes two end cap members, and the resonator member includes a peripheral edge portion sandwiched between the two end caps. The end caps can be made of crystalline quartz material. According to some embodiments, the end caps are bonded to the resonator member using a glass material, fusion bonding, and/or metal to metal bonding technology. According to some embodiments, the resonator is shaped by an etching process.

Additionally, according to some embodiments a method for manufacturing resonator-based pressure transducers is also provided. The method includes assembling a resonator member and a first housing member and preferably a second housing member to form a multi transducer assembly. The resonator member including at least two resonator portions. The multi transducer assembly is then separated to form at least two transducer units. The resonator portions are preferably shaped simultaneously, for example using etching process such as plasma etching. The separating or cutting to form the transducer units is preferably performed such that each of the transducer units has a non-circular cylindrical outer shape such as that of a right prism.

According to some embodiments the resonator member includes at least 9 resonator portions, so at to provide at least 9 transducer units per batch. According to some embodiments each resonator portion is less than about 5 mm, and the transducer units each have an outer dimension cross section of less than about 10 mm.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

According to some embodiments, an improved manufacturing process for resonator-based pressure transducers is provided. The process is a batch process in which several resonators are shaped simultaneously, using an etching process such as plasma etching. The end pieces are also shaped, if required, for several transducers. The end pieces and resonators are sandwiched together prior to separating the individual transducer units. The individual transducer units are then separated using a cutting process such as wire cutting. The described process can be used to manufacture pressure transducers having a substantially smaller size, for example 5-6 mm outer dimensions and 2-3 mm resonators, which leads to substantial cost savings. Furthermore, by using a batch process and using etching such as plasma etching to shape the resonators, further cost savings can be realized.

Figures 2A, 2B:
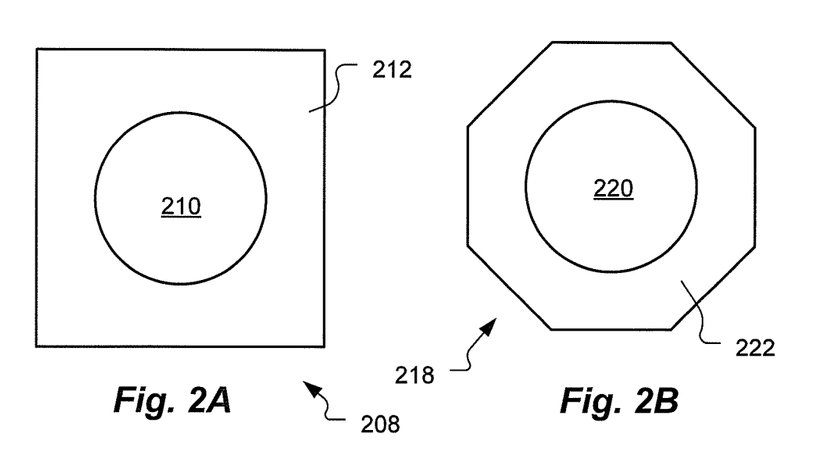
FIGS. 2A-C illustrate resonator bodies having various non-circular outer shapes, according to some embodiments.
Figure 2C:
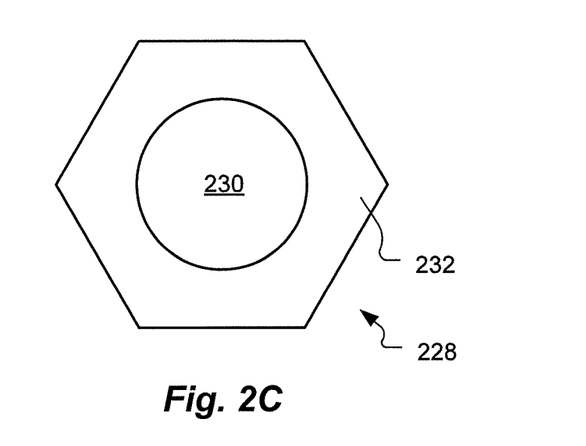

FIGS. 2A-C illustrate resonator bodies having various non-circular outer shapes, according to some embodiments. FIG. 2A shows a resonator body 208 having a square outer shape. Body 208 includes a circular resonator portion 210 that is preferably shaped using an etching process such as plasma dry etching, and a circumferential edge portion 212 having a square outer shape. FIG. 2B shows a resonator body 218 having a octagonal outer shape. Body 218 includes a circular resonator portion 220 that is preferably shaped using an etching process such as plasma dry etching, and a circumferential edge portion 222 having an octagonal outer shape. FIG. 2C shows a resonator body 228 having a hexagonal outer shape. Body 228 includes a circular resonator portion 230 that is preferably shaped using an etching process such as plasma dry etching, and a circumferential edge portion 232 having a hexagonal outer shape.

Figure 3A:
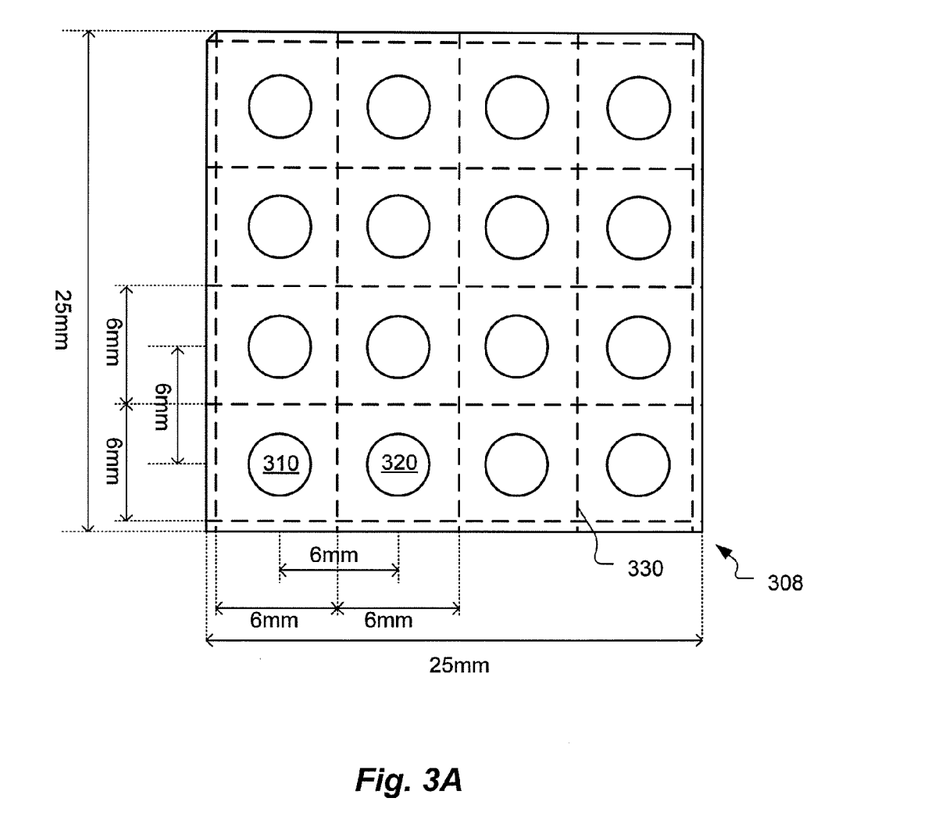
FIGS. 3A and 3B show examples of resonator body sheets including several resonator bodies prepared as part of a batch manufacturing process for pressure transducers, according to some embodiments.
Figure 3B:
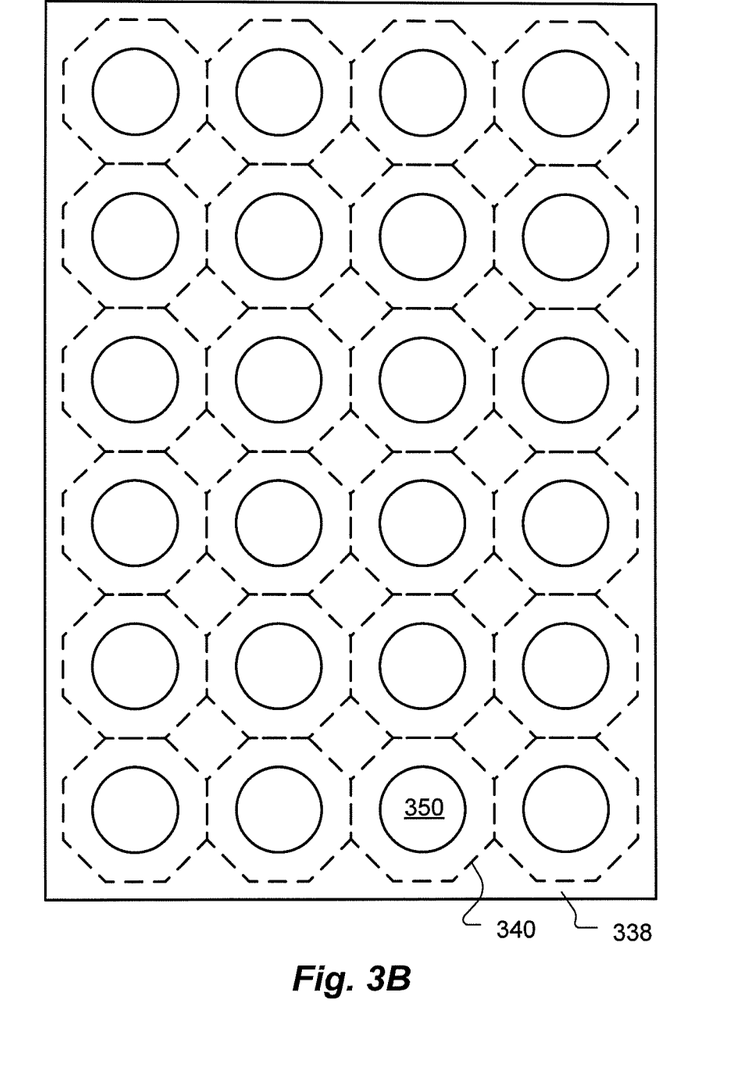

FIGS. 3A and 3B show examples of resonator body sheets including several resonator bodies prepared as part of a batch manufacturing process for pressure transducers, according to some embodiments. FIG. 3A shows a quartz plate 308 that includes 16 resonators as part of a batch process. Resonators 310 and 320 are separated by 6 mm measured center to center. The resonators are shaped preferably using an etching process such as plasma etching. After assembly, the resonators will be separated by cutting along the dashed lines such as line 330. After separation, the individual resonator bodies will measure 6 mm square. Note that if the cutting is done as shown by the dashed lines, then the outer shape of the resonator bodies, and of the transducer units, will be square. Note also that the dimensions are given here, but other dimensions are contemplated and such dimensions will vary depending upon the particular design and application. Furthermore, although 16 resonators are shown in FIG. 3A in a single batch, other numbers per batch are possible and will also depend on the dimensions, design and application. According to some embodiments, alternative piezo-electric materials are used instead of quartz for plate 308, such as Langasite and/or Langatite.

FIG. 3B shows an example of a larger batch of 24 resonators per sheet. Sheet 338 includes 24 resonators, such as resonator 350, arranged in 6 column and 4 rows as shown. After assembly, the resonators will be separated by cutting. As shown by the dashed lines 340, the cutting plan for this example will result in an octagonal outer shape for each transducer unit.

Figure 4:
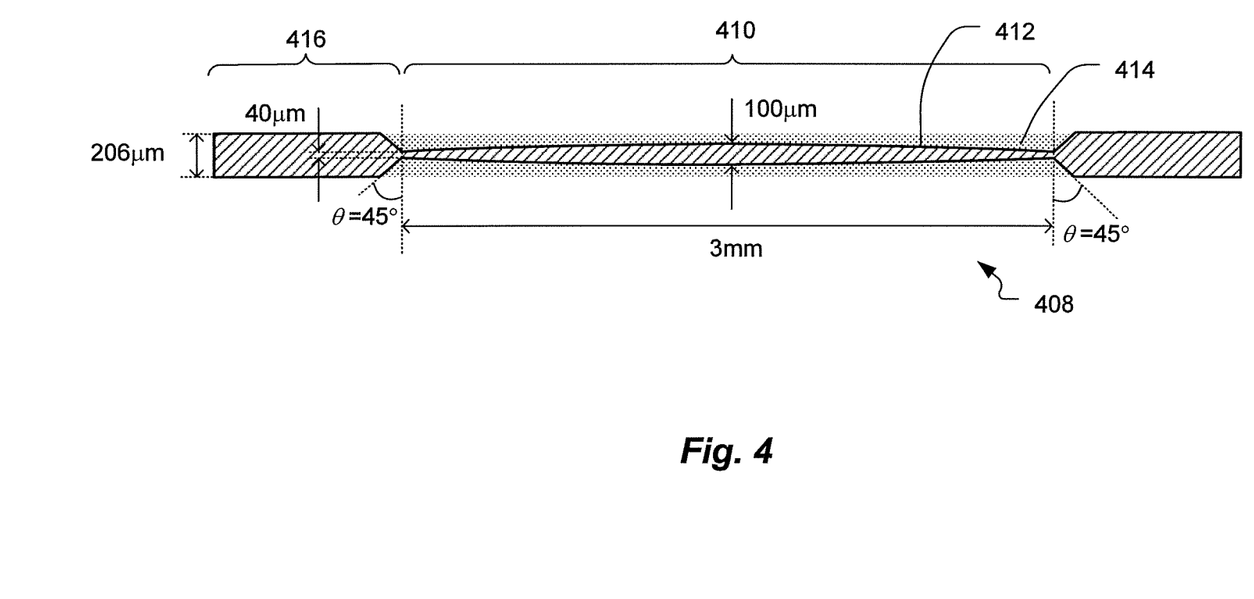
FIG. 4 shows a cross section of a resonator body, according to some embodiments.

FIG. 4 shows a cross section of a resonator body, according to some embodiments. The resonator body 408 includes a bi-convex resonator portion 410 that is shaped using an etching process. The diameter of the resonator portion 410 is 3 mm and has a center thickness of 100 microns. The thickness at the edges of the resonator 410 is about 40 microns. The curvature of the resonator surface 412 in this example has a radius of 37.5 mm. The resonator body is about 206 microns in thickness prior to etching and this is also the thickness of the circumferential edge portion 416. The material removed by the etching process is shown by the shading 414. The etching process includes (1) coating a photoresist on a quartz plate, (2) exposing a light pattern passing through a photo mask onto the coated photoresist, (3) developing the exposed photoresist, (4) etching the quartz plate, via the developed photoresist pattern, by RIE (reactive ion etching) or plasma etching, and (5) removing residual photoresist to obtain a plate with a number of convex resonator portions. The process can be repeated on the other side to fabricate bi-convex resonator portions as shown in FIG. 4. The photoresist may be coated on the quartz plate with a spinner. The photoresist may be either a positive type or a negative type. Depending on the photoresist type, a positive and negative pattern of the mask may be reversed. The mask pattern is designed so that the profile of light intensity is a cylindrically symmetrical pattern determining the desired convex shape for each resonator portion. Because the photoresist is selected so as to have a similar RIE rate to that of quartz, the convex shape of the photoresist may be transcribed onto the quartz plate. For further details of such processes, see U.S. Patent Publication No. 2009/0009036, which is incorporated by reference herein.

Note that although the dimensions are given here, according to other embodiments, other dimensions are used according the particular design and application. Other examples include edge thickness as thin as 10 microns and as thick as 55 microns, and convex curvatures of between 25 mm and 50 mm for the 3 mm diameter resonators. According to some embodiments the resonator portion can be designed as convex on one side and flat on the other (i.e. plano-convex). Flat surfaces, for example can be made by etching to a fixed uniform depth. According to some embodiments other etching processes can be used instead of or in addition to plasma etching. For example, processes common in the fabrication of integrated circuits can be used such as wet etching and in particular, anisotropic wet etching.

Figure 5:
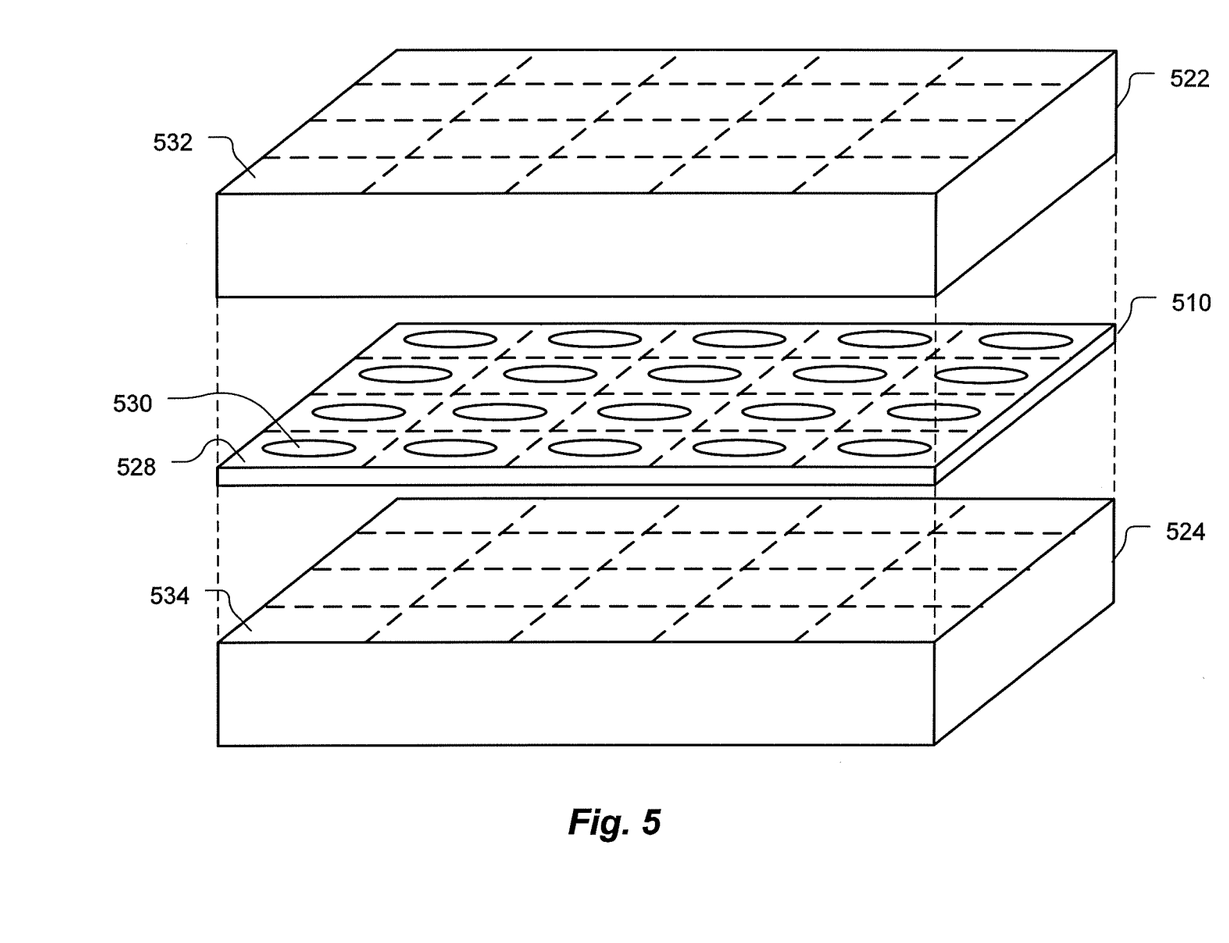
FIG. 5 illustrates the assembly of several pressure transducers in a batch process, according to some embodiments.

FIG. 5 illustrates the assembly of several pressure transducers in a batch process, according to some embodiments. Quartz plate 510 is prepared having twenty resonator portions formed, arranged in a four-by-five configuration. Two end pieces 522 and 524 are bonded to the quartz plate 510. End pieces 522 and 524 may be made of crystalline quartz material. According to some embodiments the two end pieces 522 and 524 and the quartz plate 510 are all cut from a single crystal quartz block.

Various bonding method can be used to assemble end pieces 522 and 524 with the quartz plate 510. For example, the end pieces 522 and 524 may be glued to the plate 510 by means of glass material as the bonding interfaces corresponding to the circumferential edge portions, with appropriate heat treatment. The glass material may be deposited on at least one of the end pieces 522 and 524 and plate 510, for example, by using a paste that contains glass frit and organic solution deposited through a screen mesh. The end pieces 522 and 524 and plate 510 may be bonded via the glass material under a heating process at a predetermined temperature suitable for the bonding. In another example, the end pieces 522 and 524 may be directly attached to the plate 510 without glass material, or any other material, at the bonding interfaces by, for example, fusion bonding, metal-metal bonding, as described in, for example, O. Vallin, et. al., "Direct bonded quartz resonators", Frequency Control Symposium and PDA Exhibition, 2001, Proceedings of the IEEE International, pp. 345-348, 6-8 Jun. 2001, which is incorporated herein by reference. In metal-metal bonding, a metal layer as the bonding interface may be deposited on the bonding surfaces of the end pieces 522 and 524 and the plate 510. The end pieces 522 and 524 and the plate 510 may be bonded via the metal bonding layer.

After bonding the individual pressure transducer units are separated. For example, one pressure transducer unit will be formed by resonator portion 530 within resonator body 528 being sandwiched between two end caps 532 and 534.

Figure 6A:
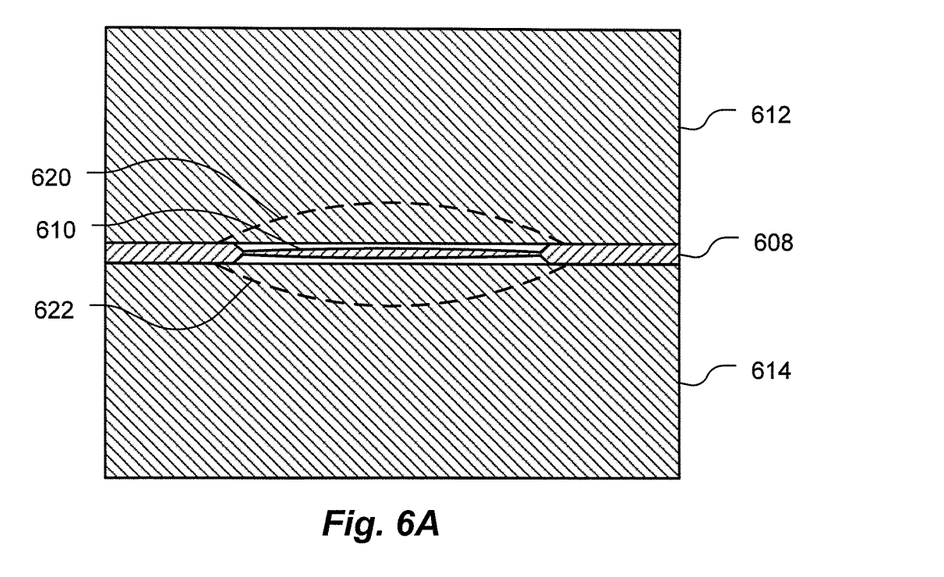
FIGS. 6A-C illustrate further details of pressure transducer units fabricated using a batch process, according to some embodiments.

FIGS. 6A-C illustrate further details of pressure transducer units fabricated using a batch process, according to some embodiments. FIG. 6A shows a pressure transducer after separation cutting. Resonator body 608 is sandwiched between upper end cap 612 and lower end cap 614. The resonator body 608 includes a bi-convex resonator portion 610. Because the resonator portion 610 is thinner than the circumferential edge portion, there is space for portion 610 to oscillate. According to some embodiments, performance of the transducer is improved by shaping concavities into the end caps 612 and 614 as shown by the dashed lines 620 and 622.

Figures 6B, 6C:
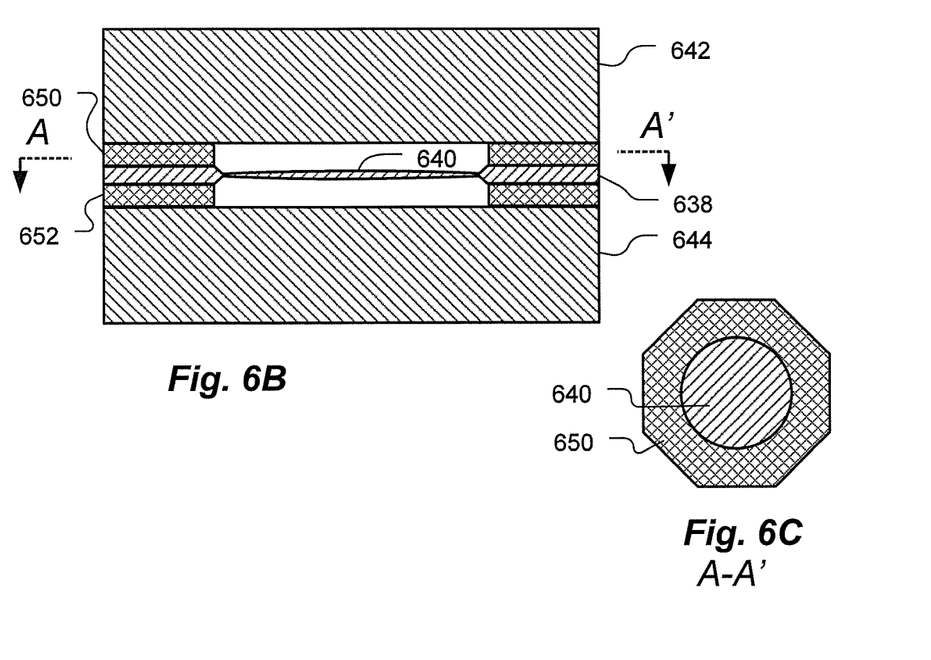

FIGS. 6B-C illustrate a pressure transducer according to some other embodiments. In FIG. 6B upper and lower spacers 650 and 652 are included on either side of the resonator body 638 and serve to a predefined space between resonator portion 610 and the end caps 642 and 644. The spacers have openings formed to correspond to the resonator portion 640. FIG. 6C shows a plan view of spacer 650 viewed along the line A-A' in FIG. 6B. The spacer openings are formed in the spacer layers and aligned with the resonator portions for several transducer units in a batch process as described herein. The sandwich assembly thus has five layers bonded together prior to separation or cutting of the individual transducer units.

Figure 7A:
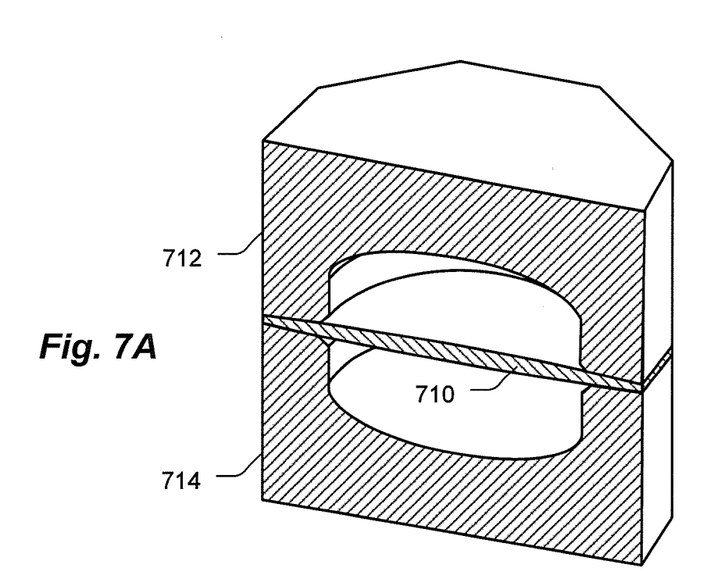
FIGS. 7A-B illustrate resonator-based pressure transducers having non-circular cylindrical outer shapes, according to some embodiments.
Figure 7B:
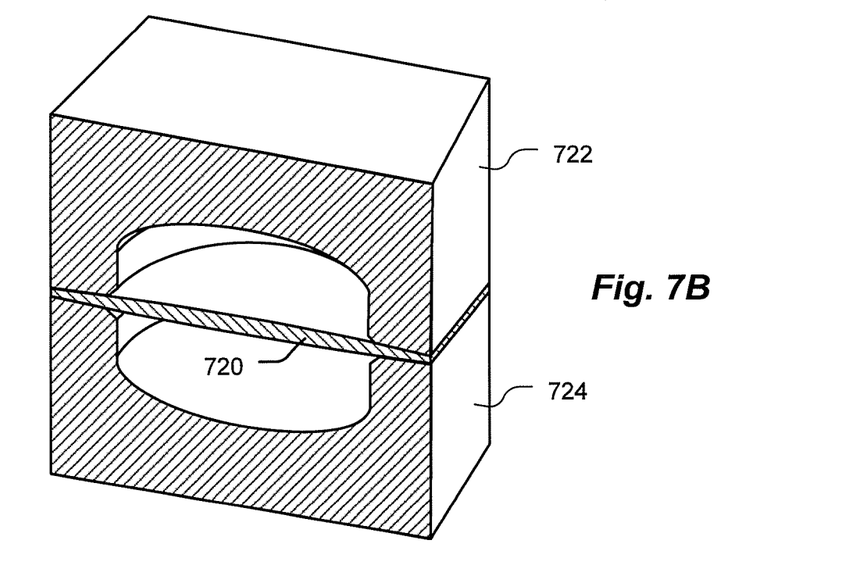

FIGS. 7A-B illustrate resonator-based pressure transducers having non-circular cylindrical outer shapes, according to some embodiments. FIG. 7A is a section of a resonator-based pressure transducers having an octagonal prism outer shape. Resonator portion 710 is sandwiched between end caps 712 and 714. The unit shown in FIG. 7A, results, for example from a cutting pattern as shown in FIG. 3B. FIG. 7B is a section of a resonator-based pressure transducers having a right square prism outer shape. Resonator portion 720 is sandwiched between end caps 722 and 724. The unit shown in FIG. 7B, results, for example from a cutting pattern as shown in FIG. 3A.

Figure 8:
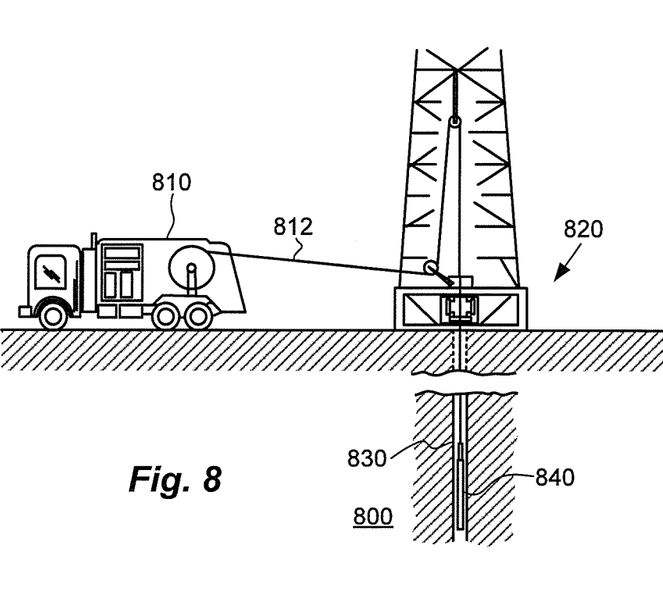
FIG. 8 shows a typical downhole setting for a resonator based pressure transducer, according to some embodiments.

FIG. 8 shows a typical downhole setting for a resonator based pressure transducer, according to some embodiments. Shown in FIG. 8 is wireline truck 810 deploying wireline cable 812 into well 830 via wellhead 820. Wireline tool 840 is disposed on the end of the cable 812 in subterranean formation 800. According to one example, wireline tool 840 is a downhole sampling tool such as the Modular Formation Dynamics Tester tool from Schlumberger. Within tool 840 are one or more downhole pressure transducers each having non-circular cylindrical outer shapes and manufactured according to the techniques described herein. Note that although a wireline deployment is shown in FIG. 8, according to other embodiments, other types of deployments are used such as in MWD/LWD tool assemblies as part of a drilling operation.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A pressure transducer comprising:
    a housing having an outer surface with a polygonal cross-section; and
    a resonator member located within the housing.

2. The pressure transducer according to claim 1 wherein the resonator member includes a piezoelectric resonator.

3. The pressure transducer according to claim 2 wherein the piezoelectric resonator is bi-convex.

4. The pressure transducer according to claim 2 wherein the resonator is a double rotation cut piezo quartz material configured or designed for vibrating in at least two modes.

5. The pressure transducer according to claim 2 wherein the resonator is circular and is less than about 5 mm in diameter.

6. The pressure transducer according to claim 1 wherein the housing is rotationally symmetrical and is not axisymmetrical.

7. The pressure transducer according to claim 1 wherein the housing includes a first and second end cap members.

8. The pressure transducer according to claim 7 wherein the resonator member includes a peripheral edge portion sandwiched between a first and second end cap.

9. The pressure transducer according to claim 7 wherein the first and second end cap members are substantially made of crystalline quartz material.

10. The pressure transducer according to claim 7 wherein the first and second end cap members are fusion bonded to the resonator member.

11. The pressure transducer according to claim 7 wherein the first and second end cap members are metal to metal bonded to the resonator member.

12. The pressure transducer according to claim 2 wherein the resonator is shaped by a plasma etching process.

13. The pressure transducer according to claim 1 wherein the housing has an outer shape of a right prism.

14. The pressure transducer according to claim 13 wherein the housing has an outer shape of a right square prism.

15. The pressure transducer according to claim 13 wherein the housing has an outer shape of an octagonal prism.

16. A method for manufacturing resonator-based pressure transducers comprising:
assembling a resonator member and a first housing member to form a multi-transducer assembly, the resonator member including at least two resonator portions; and
separating the multi transducer assembly to form at least two transducer units,
wherein the at least two resonator portions are shaped simultaneously, and
wherein the separating is performed such that each of the transducer units has an outer surface with a polygonal cross-section.

17. The method according to claim 16, wherein the assembling includes bonding the resonator member and the first housing member together.

18. The method according to claim 17, wherein the bonding includes the use of glass material and heat treatment.

19. The method according to claim 17, wherein the bonding includes fusion bonding.

20. The method according to claim 17, wherein the bonding includes metal to metal bonding.

21. The method according to claim 16, wherein the assembling includes assembling the resonator member and housing member with a second housing member.

22. The method according to claim 21, wherein the first housing member and second housing member both form end caps in each transducer unit.

23. The method according to claim 16, wherein the resonator portions are shaped at least in part using an etching process.

24. The method according to claim 23, wherein the resonator portions are shaped at least in part using a form of plasma etching.

25. The method according to claim 24, wherein the separating is performed such that each of the transducer units has an outer shape of a right prism.

26. The method according to claim 25, wherein each of the transducer units has an outer shape of a right square prism.

27. The method according to claim 25, wherein each of the transducer units has an outer shape of an octagonal prism.

28. The method according to claim 16, wherein the resonator member includes at least 9 resonator portions and the separating forms at least 9 transducer units.

29. The method according to claim 16, wherein each resonator portion is less than about 5 mm.

30. The method according to claim 16, wherein each of the transducer units has an outer dimension cross section of less than about 10 mm.

31. A pressure transducer comprising:
a housing having an outer surface with a polygonal cross-section and a plurality of pairs of opposing sidewalls, wherein each pair of opposing sidewalls forms a sidewall portion, wherein the sidewall portion has substantially the same thickness as each remaining sidewall portion;
a resonator member located within the housing.

32. The pressure transducer according to claim 31, wherein the plurality of pairs of opposing sidewalls comprise a plurality of pairs of flat surfaces.

* * * * *